United States Patent
Barie, Jr. et al.

[15] 3,684,754
[45] Aug. 15, 1972

[54] FLAME-RETARDED POLYURETHANE COMPOSITIONS COMPRISING A PHOSPHORUS-CONTAINING POLYOL AND AN AROMATIC CARBOXYLIC ACID

[72] Inventors: Walter P. Barie, Jr., Shaler Township; Norman W. Franke, Penn Hills Township; Gary M. Singerman, Borough of Monroeville, Allegheny County, all of Pa.

[73] Assignee: Gulf Research & Development Company, Pittsburgh, Pa.

[22] Filed: May 19, 1970

[21] Appl. No.: 38,876

[52] U.S. Cl. ...260/2.5 AJ, 260/2.5 AH, 260/2.5 AM, 260/2.5 AR, 260/77.5 AR, 260/DIG. 24
[51] Int. Cl. ..........................C08g 22/08, C08g 22/44
[58] Field of Search......260/2.5 AJ, 2.5 AM, 2.5 AR, 260/77.5 AR, DIG. 24

[56] References Cited

UNITED STATES PATENTS

| | | |
|---|---|---|
| 3,178,490 | 4/1965 | Petrino et al. ..............260/2.5 |
| 3,257,337 | 6/1966 | Schoepfle et al. ..........260/2.5 |
| 3,249,562 | 5/1966 | Schoepfle et al. ..........260/2.5 |
| 2,953,533 | 9/1960 | Khawam.....................260/2.5 |
| 3,259,593 | 7/1966 | Eichhorn....................260/2.5 |
| 3,294,710 | 12/1966 | Rosenberg et al. .........260/2.5 |
| 3,365,470 | 1/1968 | Schmerling.............260/346.6 |

FOREIGN PATENTS OR APPLICATIONS

| | | |
|---|---|---|
| 285,690 | 9/1966 | Australia....................260/2.5 |

*Primary Examiner*—Donald E. Czaja
*Assistant Examiner*—Ronald W. Griffin
*Attorney*—Meyer Neishloss, Deane E. Keith and Donald L. Rose

[57] ABSTRACT

Flame-retarded polyurethane materials and foams containing a flame-retarding amount of a synergistic combination of a phosphorus-containing polyol having from two to about eight hydroxyl groups and an aromatic carboxylic acid having at least two carboxyl groups attached to one or more benzene nuclei.

5 Claims, No Drawings

FLAME-RETARDED POLYURETHANE COMPOSITIONS COMPRISING A PHOSPHORUS-CONTAINING POLYOL AND AN AROMATIC CARBOXYLIC ACID

The use of certain additives for the purpose of reducing the flammability of polyurethane materials and polyurethane foams is well known to those skilled in the art. Among the additives currently employed for such use are various types of phosphorus-containing compounds. The phosphorous compounds are generally used either alone or in combination with other materials such as organic or inorganic compounds of antimony or halogenated organic materials. The phosphorus-containing compounds may be non-reactive chemicals such as tris(2-chloroethyl)phosphate, tris(2,3-dibromopropyl)phosphate, ammonium phosphate, or more complicated hydroxy compounds which are reacted into the foam structure. Antimony trioxide is also used to reduce the flammability of urethanes, especially in combination with other materials such as halogenated hydrocarbon or ammonium phosphate.

One drawback of these known compounds and combinations of compounds, however, has been the fact that generally large amounts (up to 35 percent) of the additive must be incorporated into the urethane polymer in order to render it acceptably flame-resistant. Such large quantities of additives often have a deleterious effect upon the properties of the foam. Mineral fillers tend to settle out; foams are weakened and show a tendency to shrink; some additives tend to crystallize or oil out of the polymer (plasticizer migration) after a relatively short time of incorporation therein.

We have now found that superior flame-retarding properties can be imparted into polyurethane resins, particularly rigid polyurethane foams, by incorporating into the polymer a flame-retarding combination of a mixture of a phosphorus-containing polyol and an aromatic carboxylic acid, both of which are defined as set forth hereinbelow, the total amount of both components being less than required for flame-retardancy if they were functioning by a simple additive effect.

The novel synergistic combination provides improved flame retardancy over the additives of the prior art, and additionally, provides this superior result at materially lower concentrations than previously found to be necessary for the known additives.

The results shown by the use of the above-mentioned flame-retardant combination are surprising and unexpected in that the combination provides a greater degree of flame-retardancy than one would expect from the results shown by the use of the components individually, i.e., they are synergistic. Moreover, the combination produces flame-retardancy at lower concentrations in the polymer than heretofore required for the individual materials. Additionally, the effectiveness of the combination is achieved in the absence of any third ingredient, such as compounds of antimony which were previously believed to be necessary.

It is therefore an object of the present invention to provide flame-retardant compositions comprising polyurethane resins containing a flame-retarding amount of a synergistic combination of a phosphorus-containing polyol and an aromatic carboxylic acid.

It is a further object of the present invention to provide flame-retardant compositions comprising a rigid polyurethane foam containing a flame-retarding amount of a synergistic combination of a phosphorus-containing polyol and an aromatic carboxylic acid.

These and other objects of the instant invention will become more apparent to those skilled in the art upon reading the more detailed description set forth hereinbelow.

As mentioned above, the first essential component of our novel flame-retardant composition is an aromatic carboxylic acid. The preferred aromatic carboxylic acids include those having a benzene, naphthalene, heterocyclic, diphenyl, diphenyl ketone, diphenyl ether or diphenyl alkane nucleus.

A second requirement in regard to the aromatic carboxylic acids suitable for use herein is that the aromatic carboxylic acid must have at least two carboxyl groups in each molecule, that is, it must be an aromatic polycarboxylic acid. These carboxyl groups can be attached to the same benzene ring, or in the case of polynuclear aromatic compounds, the carboxyl groups can be attached to different benzene rings in the molecule. Illustrative of the aromatic carboxylic acids which may be used are terephthalic acid, phthalic acid, isophthalic acid, trimellitic acid, pyromellitic acid, trimesic acid, 4,4'-benzophenonedicarboxylic acid, 3,4,3',4'3,4,3'-benzophenonetricarboxylic acid, 1,4-naphthalenedicarboxylic acid, 2,6-naphthalenedicarboxylic acid, 3,5-biphenyldicarboxylic acid, 4,4'-biphenyldicarboxylic acid, etc. Particularly preferred acids are selected from those having the following formulas:

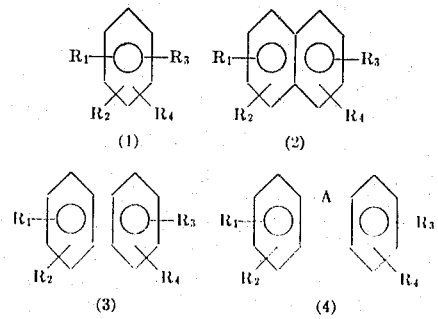

wherein $R_1$ is carboxyl and $R_2$, $R_3$, and $R_4$ are independently selected from hydrogen and carboxyl groups with at least one being carboxyl, and A is a bridging group selected from the class consisting of lower-alkylene containing from one to six carbon atoms, carbonyl, sulfonyl and oxygen.

The second essential component of our novel flame-retardant composition is a phosphorus-containing polyol. A requirement in regard to the phosphorus-containing compounds suitable for use herein is that they contain at least two and up to about eight hydroxyl substituents per molecule which are reactive with an isocyanate group. This type of phosphorus-containing compound is referred to herein as a phosphorus-containing polyol. Such polyols are prepared by a number of ways which are well known to those skilled in the art, and many are available commercially. In fact, phosphorus-containing polyols are used to reduce the flammability of polyurethane foams, although when these materials are used as the sole flame-retarding agents, they must be used at significantly higher concentrations in the foam than when they are used in combination with aromatic carboxylic acids as described by the present invention.

Among the useful types of phosphorus-containing polyols that can be employed in the invention are those represented by the general formulas:

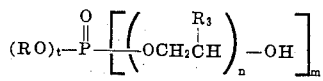

and

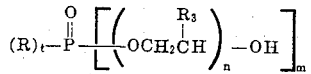 (6)

wherein $n$ is a number from 1 to 7, $m$ is a number from 1 to 2, and $t$ is a number from 1 to 2, the sum of the numbers t and m being equal to three. R is an alkyl, hydroxyalkyl, alkoxyalkyl, aromatic (phenyl) or hydroxyphenyl group and may be represented by methyl, ethyl, hydroxymethyl, hydroxyethyl, isopropyl, isobutyl, tertiary butyl or amyl, etc. $R_3$ is hydrogen, methyl or ethyl. These materials are terminated in each of the oxyalkylation chains by a hydroxyl group so that the material contains active hydrogen atoms and is adapted to react with the polyisocyanate component, or with the carboxylic acid to form portions of the polyurethane molecules.

These phosphorus-containing polyol materials include compositions having the following formulas:

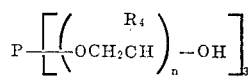 (7)

and

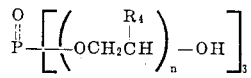 (8)

wherein $n$ is a number from 1 to 7 and $R_4$ is hydrogen, methyl, ethyl or phenyl and may be substituted with noninterfering substituents, such as halogen atoms, ether and ester radicals and the like. Exemplary of the compounds having Formula (7) are tris(polyalkyleneglycol)phosphites such as tris(dipropyleneglycol)phosphite and other tris(polypropyleneglycol)phosphites, tris(diethyleneglycol)phosphite and the like. Suitable compounds having the structure of Formula (8) include tris-dipropyleneglycol phosphate, dipropyleneglycol pentol triphosphate, and phosphoric acid-propylene oxide adducts; and dialkyl dialkanolaminoalkylphosphonates having the formula:

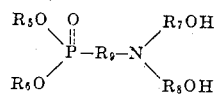 (9)

where $R_5$ and $R_6$ are selected from the group consisting of lower alkyl and lower haloalkyl radicals; $R_7$ and $R_8$ are lower alkylene radicals and $R_9$ is a lower alkylene radical. Specific illustrative examples include O,O'-diethyl N,N-bis(2-hydroxyethyl)-aminomethylphosphonate; O,O'-bis(2-chloroethyl) N,N-bis(2-hydroxyethyl)aminomethylphosphonate; and O,O'-diphenyl N,N-bis(2-hydroxypropyl)aminomethylphosphonate; and O,O'-bis(4-hydroxybutyl) N,N-bis(2-hydroxyethyl)aminoisopropylphosphonate. The first mentioned of these four compounds is preferred; a hydroxyalkyl polyphosphate that is represented by the formula:

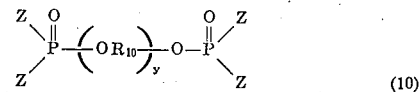 (10)

wherein $R_{10}$ represents the divalent residue of a vicinal epoxide, $y$ represents a number that has a value from 1 to 6, and wherein each Z individually represents the group:

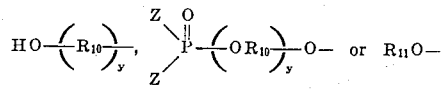

where $R_{11}$ is an alkyl group having from one to six carbon atoms with at least two Z groups in the molecule being $HO-R_{10}O-_y$.

The preferred phosphorus-containing polyols for use in this invention are the hydroxyalkyl polyphosphates or the O,O'-disubstituted N,N-bis(hydroxyalkyl)aminoalkylphosphonates.

The polyurethane materials and foams of this invention are prepared by reacting a mixture of the aromatic carboxylic acid and the phosphorus-containing polyol, both of which are described hereinabove, with a non-phosphorus-containing polyol and an organic polyisocyanate and optionally to the reaction system such assistants may be added as a silicone oil and the like to serve as surfactant. Also an amine or organo tin compound and the like can be added as a catalyst and a blowing agent if a foamed material is desired.

The non-phosphorus-containing polyols are well known by those skilled in the urethane art, and any of the usual polyols normally used to prepare polyurethanes may be utilized in this invention. Illustrative of these non-phosphorus-containing polyols are polyethers such as polyoxyalkylene glycols, for example, those obtained by the addition of one or more alkylene oxides such as ethylene oxide, propylene oxide, and the like, to water, ethylene glycol, propylene glycol, diethylene glycol, dipropylene glycol and the like or mixtures thereof; polyether glycols prepared by reacting ethylene oxide, propylene oxide or mixtures thereof with mono- and poly-nuclear dihydroxybenzenes such as catechol, resorcinol, hydroquinone, orcinol, 2,2-bis(p-hydroxyphenyl)propane, bis(p-hydroxyphenyl)methane, and the like; polyethers prepared by reacting ethylene oxide, propylene oxide, and like alkylene oxides or mixtures thereof with aliphatic polyols such as glycerol, sorbitol, trimethylolpropane, 1,2,6-hexanetriol, pentaerythritol, sucrose, or glycosides such as the methyl, ethyl, propyl, butyl and 2-ethylhexyl derivatives of arabinose, xylose, fructose, glucose, rhamnose, and the like; and polyethers prepared by reacting ethylene oxide, propylene oxide and like alkylene oxides or mixtures thereof with alicyclic polyols such as tetramethylol cyclohexanol, trimethylol cyclohexanol, and the like, polyols containing a heterocyclic nucleus such as 3,3,5-tris(hydroxymethyl)-5-methyl-4-hydroxytetrahydropyran, 3,3,5,5-tetrakis(hydroxymethyl)-4-hydroxytetrahydropyran, and the like, and polyhydric phenols such as 2,2-bis(hydroxyphenyl)ethanol, pyrogallol, phloroglucinol, poly(hydroxyphenyl)alkanes, for example, 1,1,3-tris(hydroxy-phenyl)ethanes, 1,1,3,3-tetrakis(hydroxy-3-methylphenyl)propanes, 1,1,4,4-tetrakis(hydroxyphenyl)butanes, and the like.

The non-phosphorus-containing polyols which can be employed in the present invention also include the adducts of primary aromatic mono-and poly amines with alkylene oxides such as ethylene oxide, propylene oxide, and the like or mixtures thereof. Examples of primary amines from which such adducts can be prepared are aniline, toluidine, xylidine, benzidine, o-tolidine, o-, m-, and p-phenylenediamine, 2,4- and 2,6-diaminotoluene, 2,4,6-triaminotoluene, 3,4,5-triaminotoluene, 4,4'-methylenedianiline, 4,4'-ethylidenedianiline and the like, as well as polyamines prepared by interaction of aromatic primary amines such as aniline, o-toluidine, p-chloroaniline, p-bromoaniline and the like with formaldehyde and the like aldehydes in the presence of a mineral acid such as hydrochloric acid. Particularly useful polyols of the above type derived by reaction of alkylene oxides and polyamines are those comprising a polyol adduct produced by mixing under hydroxyalkylation conditions from 2 to 20 molecular equivalents of ethylene oxide, propylene oxide or 1,2-butylene oxide, or mixtures thereof, and one amine equivalent of a polyamine mixture, 100 parts of said polyamine mixture containing from 35 to 90 parts of methylenedianilines, the remaining parts being triamines and polyamines of higher molecular weight, said methylenedianilines, triamines, and polyamines of higher molecular weight having been formed by acid condensation of aniline and formaldehyde.

The polyols which can be employed in the present invention also include other N,N-di(hydroxyalkyl)amines such as O,O'-bis(diethanolaminomethyl)-p-nonylphenol. N,N,N',N'-tetra-(2-hydroxypropyl)ethylenediamine, N,N,N',N'-tetra(2-hydroxyethyl)-ethylenediamine, and the like hydroxyalkylated aliphatic diamines.

Other useful non-phosphorus-containing polyols include polyols which are half esters derived by reacting a polycarboxylic acid intramolecular anhydride with a polyol of equivalent weight of 70 to 200 and average functionality of 2 to 8 such as those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Examples of such acids are phthalic acid, terephthalic acid, isophthalic acid, succinic acid, glutaric acid, adipic acid, pimelic acid and the like. Examples of polyhydric alcohols used to form the above polyesters are trimethylolpropane, trimethylolethane, mannitol 1,2,6-hexanetriol, glycerol, pentaerythritol, and the like. Minor proportions of dihydric alcohols such as ethylene glycol, diethylene glycol, 1,2-propylene glycol, 1,4-butanediol and the like, can also be used in combination with trihydric and higher polyhydric alcohols in the preparation of the above polyesters.

The polyesters polyols which can be employed also include polyesters obtained by condensation of a lactone such as epsilon-caprolactone, epsilon-caprolactone substituted by one or more alkoxy, alkyl, aralkyl or cycloalkyl groups, and the like, with a glycol such as ethylene glycol, propylene glycol, and the like, a diamine such as ethylene diamine, 1,2-propylenediamine, and the like, or an alkanolamine such as ethanolamine, propanolamine, isopropanolamine, and the like, in accordance with procedures well known in the art, for example, those described in U.S. Pat. No. 2,914,556.

The isocyanates employed to produce the urethane polymers of this invention include any of the prior art organic polyisocyanates that are normally employed in the production of polyurethanes. Specific illustrative examples include the following: 2,4-toluene diisocyanate, 2,6-toluene diisocyanate, diphenylmethane diisocyanate (MDI), polymethylene polyphenylisocyanate (PAPI), 1,2,4-benzene triisocyanate, 1,3,3-pentane triisocyanate, 1,2-propylene diisocyanate, 1,2,4-butane triisocyanate, triphenylmethane triisocyanate, diphenyl diisocyanate, triphenyl diisocyanate, chlorophenyl diisocyanate, 1,4-tetramethylene diisocyanate; para-penylene diisocyanate, hexamethylene diisocyanate, 3,3'-dimethyl-4,4'-biphenylene diisocyanate, 3,3'-dimethoxy-4,4'-biphenylene diisocyanate, the liquid reaction products of (1) diisocyanates and(2) polyols or polyamines, and the like. In addition mixtures of isocyanates may be employed as well as the many impure or crude polyisocyanates that are commercially available such as crude mixtures of methylene bis(4-phenylisocyanate).

Of the organic polyisocyanates, the aryl and alkaryl polyisocyanates of the benzene and naphthalene series are more reactive and less toxic than the aliphatic members. Consequently, the aromatic compounds are preferred in the present invention.

These polyisocyanate components are advantageously used in a so called "one-shot" system, wherein they are stored separately from the polyol, including the phosphorus polyol and the aromatic carboxylic acid components until the foam is to be formed. The polyisocyanate component is then added to the other components which may, if preferred, be made up into a preformed master batch mixture to which the polyisocyanate component is added as rapidly as practicable. The mixture is then allowed to foam and cure. Alternatively, one may, if preferred, prepare a mixture of the isocyanate and the aromatic carboxylic acid, constituting what may be termed "package A," while the remaining components may be made up into a preformed master batch, termed "package B." "Package A" and "package B" are then combined as rapidly as possible, and the mixture is then allowed to foam and cure.

In preparing the polyurethane compositions of this invention the polyisocyanate, the polyol materials, the carboxylic acid and other isocyanate-reactive groups, if present, are reacted in a stoichiometric ratio such that for every one equivalent of isocyanate groups, the sum of the equivalents of hydroxyl groups, carboxyl groups, and other isocyanate-reactive groups, if present, is also one equivalent. However, a slight excess, up to 10 percent, of equivalents of either the polyisocyanate or mixture of polyols, acid and other reactive material can be used. Preferably, the proportions of reactants are sufficient to provide a ratio of isocyanate group to those groups reactive with the isocyanate group of about 1.05 to 1. The small excess of isocyanate reactant is used to ensure complete reaction, although strict adherence to this ratio is not essential.

The concentrations of phosphorus-containing polyol and aromatic carboxylic acid are variable, depending upon the degree of flame retardancy desired in the urethane foam, but even small amounts can be effective. Thus for a foam derived primarily from polymethylene polyphenylisocyanate and a propylene oxide adduct of trimethylolpropane, a mixture of about two percent of terephthalic acid and about 0.36 percent of the element phosphorus, (added as diethyl N,N-bis(2-hydroxyethyl)-aminomethylphosphonate) by weight of reactants, exclusive of the weight of blowing agent, effectively flame retards the foam. Different combinations of carboxylic acid, phosphorus-containing polyols, polyisocyanates, and non-phosphorus-containing polyols will require more or less of the carboxylic acid and phosphorus compound, depending upon the individual components to achieve flame retardancy, but the total amount of the carboxylic acid and phosphorus-containing polyol will still be less than the amount required for flame retardancy if they were functioning by a simple additive effect.

Any foaming agent commonly used in the art can be employed. Suitable foaming agents are those materials capable of liberating gaseous products when heated or when reacted with an isocyanate. The preferred foaming agents are the fluorochlorocarbons boiling in the range of about 20° C. to about 56° C. and mixtures thereof, for example, trichlorofluoromethane, trichlorotrifluoroethane, dichloromonofluoromethane, monochloroethane, monochloromonofluoroethane, difluoromonochloroethane, difluorodichloroethane. Other foaming agents which can be employed include water, a tertiary alcohol and a concentrated acid such as is disclosed in U.S. Pat. No. 2,865,869, polymethylol phenols, dimethylolureas, polycarboxylic compounds and formic acid. Mixtures of any of the above foaming agents may also be used. The amount of foaming agent used is not critical but will be dictated by the type of foam desired. If a very dense foam is desired, only a small amount need be used. If a very light foam is desired, a maximum amount should be used. The amount used will also depend upon the particular foaming agent.

If desired, a reaction catalyst can be employed in preparing the polyurethane foam. The catalysts employed can be any of the conventional catalysts for isocyanate reaction. Such catalysts include a wide variety of compounds, for example, tertiary amines such as N-methylmorpholine, N,N,N',N'-tetra-methyl-1,4-butanediamine, 1,4-diazabicyclo[2·2·2]octane, 1,1,3,3-tetramethylguanadine and the like. Also useful as catalysts are organic tin compounds such as stannous octoate, dibutyltin dilaurate, dibutyltin diacetate, and the like. Many combinations of catalysts can be employed; for instance, it is at times useful to employ one or two tertiary amines in combination with an organotin compound such as dibutyltin dilaurate. Catalysts, if employed, are preferably used in an amount of about 0.1 percent up to about 5 percent by weight, based upon the reactive components in the foamable mixture.

There may also be incorporated into the reaction composition various conventional foam stabilizers to control the cellular structure of the foamed polyurethane obtained. Used for this purpose are various surfactants including various silicone compounds and silicone oil mixtures, e.g., dimethylsiloxane and alkylsilane-polyoxyalkylene glycol copolymers sold under various names such as "Silicone L–520" and "Dow Corning 195," etc. About 0.1 to three parts of the foam stabilizing agent per 100 parts by weight of the polyol and polyisocyanate reactants are preferred.

The following examples serve to illustrate the invention but are not intended as limitations. All parts and percentages used in the examples are by weight unless otherwise indicated.

EXAMPLE 1

This example illustrates the preparation of a rigid polyurethane foam using a combination of terephthalic acid and polyoxypropylene alkoxy diphosphate as the flame retardant. The diphosphate is a commercially available material which is a mixture of related molecules having the following structure:

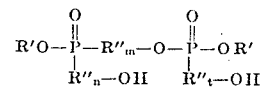

wherein $m$, $n$, and $t$ vary from 1 to 7, $R'$ is either ethyl or n-butyl, depending upon the individual molecule and $R''$ is the group $—O—CH_2CH(CH_3)—$ such that the material has a hydroxyl number of about 205, a phosphorus content of about 11.3 percent and a viscosity at 25° C. of about 250 c.p.s.

| Ingredient: | Parts |
|---|---|
| Propylene oxide adduct of trimethylolpropane[1] | 59.26 |
| Polyisocyanate[2] | 70.10 |
| Diphosphate | 4.56 |
| Terephthalic acid | 5.73 |
| N,N,N',N'-tetramethylbutane-1,4-diamine | 2.00 |
| Surfactant[3] | 1.50 |
| Fluorotrichloromethane | 22.0 |

[1] A propylene oxide adduct of trimethylolpropane having a basic functionality of 3, an average molecular weight of about 425, and a hydroxyl number of about 397.
[2] A polymethylene polyphenylisocyanate having an isocyanate equivalent of about 133.5, an available NCO content of about 32 percent and a viscosity at 25° C. of about 250 c.p.s.
[3] A polysiloxane-polyoxyalkylene block copolymer used as a foam stabilizer or surfactant.

Example 1 is made to contain a sufficient amount of the diphosphate so that the total formulation contains 0.36 percent of phosphorus by weight, exclusive of the foaming agent, $CFCl_3$. After sieving the terephthalic acid through a 325 mesh screen, the polyisocyanate and the terephthalic acid were stirred together thoroughly. This mixture is termed "Package A." In a separate container, the remaining ingredients were blended to a homogeneous mixture by means of an air-driven stirrer and termed "Package B." "Package A" and "Package B" were then combined as rapidly as possible and blended thoroughly with an air-driven stirrer. The foaming characteristics were cream time of about 40 seconds and a rise time of about 210 seconds after the mixture was poured into an open 2.5-inch × 8-inch × 10-inch cardboard box. The density of the resulting rigid foam was 2.09 p.c.f., and was classified as self-extinguishing according to ASTM test D1692-59T, with an extent of burning before self-extinguishment equal to 1.67 inches.

EXAMPLES 2 to 18

The formulations used in these examples are essentially identical to the formulation of Example 1, except that varying amounts of the diphosphate and terephthalic acid (TPA) were used. In every example the isocyanate to hydroxyl plus carboxyl ratio was the same as in Example 1, about 1.05 to 1. The mixtures were tested for flame retardancy in accordance with the procedure of Example 1. The resulting foams had properties shown in Table 1.

TABLE 1

| | Percent TPA[1] | Percent P[1] | Density (p.c.f.) | Rating[2] | Burning (in./min.) | Inches burned |
|---|---|---|---|---|---|---|
| 1 | 4.0 | 0.36 | 2.09 | S.E. | | 1.67 |
| 2 | | | 2.22 | Burning | 14.8 | |
| 3 | 12.0 | | 2.20 | S.E. | | 1.35 |
| 4 | 11.0 | | 2.26 | S.E. | | 2.78 |
| 5 | 10.0 | | 2.36 | S.E. | | 2.52 |
| 6 | 9.0 | | 2.22 | Burning | 6.94 | |
| 7 | 8.0 | | 2.24 | do | 5.25 | |
| 8 | | 2.0 | 3.01 | S.E. | | 1.46 |
| 9 | | 1.0 | 2.53 | S.E. | | 2.18 |
| 10 | | 0.75 | 2.40 | S.E. | | 3.32 |
| 11 | | 0.74 | 2.34 | S.E. | | 3.12 |
| 12 | | 0.73 | 2.34 | S.E. | | 3.31 |
| 13 | | 0.72 | 2.40 | Burning | 2.53 | |
| 14 | | 0.70 | 2.41 | do | 3.61 | |
| 15 | | 0.65 | 2.44 | do | 3.23 | |
| 16 | | 0.50 | 2.43 | do | 3.88 | |
| 17 | 3.0 | 0.36 | 2.19 | S.E. | | 2.18 |
| 18 | 2.0 | 0.36 | 2.38 | S.E. | | 2.81 |

[1] Percent by weight exclusive of the weight of the foaming agent, CFCl₃
[2] Flammability rating described in ASTM D1692-59T. S.E.=self-extinguishing rating.

In Table I, Examples 3 to 7 are listed to establish the effect on foam flammability of the terephthalic acid alone. It is seen that at 10 percent or more of the terephthalic acid, the foam is self-extinguishing (Examples 3 to 5), but at 9 percent and lower (Examples 6 and 7), the foam burns. Examples 8 to 16 show the effect of phosphorus alone. It is seen that at least 0.73 percent by weight of phosphorus is needed to render the foam self-extinguishing (Example 12). Anything less than this amount of phosphorus will allow the foam to burn (Examples 13 to 16). Examples 1, 17, and 18 demonstrate the synergistic effect on flammability of combinations of the terephthalic acid and the phosphorus-containing polyol. That is, if the effects of these two materials were simply additive, then a combination of 4.5 percent of terephthalic acid and 0.36 percent of phosphorus should allow the foam to burn, since 9 percent of terephthalic acid (Example 6) or 0.72 percent of phosphorus (Example 13) both allow the foam to burn. Therefore, it would be expected that a combination of terephthalic acid and phosphorus greater than 4.5 percent and 0.36 percent, respectively, would be required by additive effect to make the foam self-extinguishing. Surprisingly, combinations of amounts less than would be required by simple additivity requirements render the foam self-extinguishing (Examples 1, 17, and 18).

EXAMPLES 19 to 24

The formulations used in these examples are essentially identical to the formulation of Example 1. All the materials used in these examples are the same as those of Example 1 except that the acid (terephthalic acid) of Example 1 was replaced with the acids listed in Table II. The mixtures were treated in accordance with the procedure of Example 1 and the resulting foams had properties shown in Table II.

TABLE II

| | Percent acid[1] | Percent P[1] | Density (p.c.f.) | Rating[2] | Burning (in./min.) | Inches burned |
|---|---|---|---|---|---|---|
| 19 | 15.9 BTA | | 1.71 | Burning | 6.25 | |
| 20 | 4.0 BTA | 0.5 | 2.48 | S.E. | | 1.85 |
| 21 | 6.0 BA | 0.5 | 2.61 | Burning | 3.38 | |

[1] Percent by weight exclusive of the weight of the foaming agent, CFCl₃; BTA=3,3',4,4'-benzophenonetetracarboxylic acid. BA=benzoic acid.
[2] Flammability rating described in ASTM D1692-59T. S.E.=self-extinguishing rating.

Examples 19 and 20 when used in conjunction with Example 13 (Table I) illustrate a synergistic reduction in foam flammability when combinations of 3,3',4,4'-benzophenonetetra-carboxylic acid and the diphosphate are used as the flame-retardant mixture. Their effect together, as seen in Table II, is greater than the effect of either one alone. Example 21 shows that the monoacid, benzoic acid, does not impart flame retardancy in combination with the diphosphate composition in that proportion at which the polyacid-diphosphate combinations do impart flame retardancy.

In like manner polyurethane foams are flame-retarded by using a synergistic combination of 2,6-naphthalene-dicarboxylic acid and tris-dipropyleneglycol phosphate; pyromellitic acid and bis-polypropyleneglycol hydroxypropyl-phosphonate; phenanthrene-1,3,9,10-tetracarboxylic acid and tris-diethyleneglycol phosphite; 4,4'-biphenyldicarboxylic acid and tris-dipropyleneglycol phosphite; diphenyl-3'-methylamino-3,4-dicarboxylic acid and tetrakis-dipropyleneglycol 1,2-diphosphonoethane; etc., the total amount of both components being less than required for flame retardancy if they were functioning by a simple additive effect.

Although specific examples of the invention have been set forth hereinabove, it is not intended to limit the invention thereto, but to include all of the variations and modifications falling within the scope of the appended claims.

We claim:

1. A flame-retarded rigid polyurethane foam having incorporated therein a flame-retarding amount of a composition comprising a combination of (1) a mono or dinuclear aromatic carboxylic acid having the structural formula:

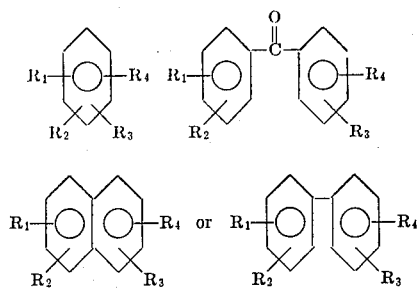

2. A flame-retarded rigid polyurethane foam in accordance with claim 1 in which (1) is terephthalic acid.

3. A flame-retarded rigid polyurethane foam in accordance with claim 1 in which (1) is trimellitic acid.

4. A flame-retarded rigid polyurethane foam in accordance with claim 1 in which (1) is 3,4,3',4'-benzophenonetetracarboxylic acid.

5. A flame-retarded rigid polyurethane foam in accordance with claim 1 in which $R_{10}$ is ethyl or n-butyl.

* * * * *

UNITED STATES PATENT OFFICE
CERTIFICATE OF CORRECTION

Page 1 of two pages.
Patent No. 3,684,754          Dated   August 15, 1972

Inventor(s) Walter P. Barie, Jr., Norman W. Franke and Gary M. Singerman.

It is certified that error appears in the above-identified patent and that said Letters Patent are hereby corrected as shown below:

Col. 1, line 10, "phosphorous" should read --phosphorus--.
Col. 2, lines 29 and 30, " 3,4,3',4'3,4,3'-benzophenonetricarboxylic acid" should read -- 3,4,3',4'-benzophenonetetracarboxylic acid, 3,4,3'-benzophenonetricarboxylic acid,--.
Col. 2, line 45, structural formula (3), insert a chemical bond line between the two substituted phenyl groups.
Col. 2, line 45, structural formula (4), insert a chemical bond line from the A group to each of the substituted phenyl groups. Col. 6, line 28, "para-penylene" should read --para-phenylene--. Col. 10, line 34, " 3,3',- " should read -- 3,3',4,4'- --. Col. 11, Claim 1, after the formulas insert the following:

wherein $R_1$ is carboxyl and $R_2$, $R_3$ and $R_4$ are independently selected from hydrogen and carboxyl groups with at least one being carboxyl and (2) a phosphorus-containing polyol having the structural formula:

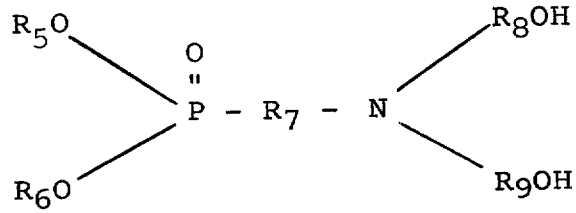

wherein $R_5$ and $R_6$ are lower alkyl or lower haloalkyl radicals and $R_7$, $R_8$ and $R_9$ are lower alkylene radicals, or

UNITED STATES PATENT OFFICE
CERTIFICATE OF CORRECTION

Page 2 of two pages.

Patent No. 3,684,754    Dated  August 15, 1972

Inventor(s) Walter P. Barie, Jr., Norman W. Franke and Gary M. Singerman.

It is certified that error appears in the above-identified patent and that said Letters Patent are hereby corrected as shown below:

(Claim 1 continued)

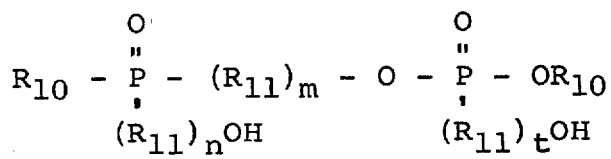

wherein $R_{10}$ is an alkyl group having one to six carbon atoms, $R_{11}$ is the group $-OCH_2CH(CH_3)-$ and m, n and t are a number from one to seven, the sum of the flame-retarding amounts of components (1) and (2) being less than the sum of components (1) and (2) that are required in the same polymer to function in a flame-retarding manner by a simple additive effect.

Signed and sealed this 23rd day of January 1973.

(SEAL)
Attest:

EDWARD M. FLETCHER, JR.
Attesting Officer

ROBERT GOTTSCHALK
Commissioner of Patents